United States Patent
Kikuchi

(10) Patent No.: US 10,348,212 B2
(45) Date of Patent: Jul. 9, 2019

(54) SYNCHRONOUS RECTIFICATION CONTROLLER INCLUDING SYNCHRONOUS RECTIFICATION TRANSISTOR FOR INSULATED SYNCHRONOUS RECTIFICATION DC/DC CONVERTER

(71) Applicant: ROHM CO., LTD., Ukyo-Ku Kyoto (JP)

(72) Inventor: Hiroki Kikuchi, Ukyo-Ku Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/843,726

(22) Filed: Dec. 15, 2017

(65) Prior Publication Data

US 2018/0175737 A1    Jun. 21, 2018

(30) Foreign Application Priority Data

Dec. 16, 2016  (JP) .................................. 2016-244700

(51) Int. Cl.
*H02M 1/00* (2006.01)
*H02M 1/08* (2006.01)
*H02M 3/335* (2006.01)

(52) U.S. Cl.
CPC ......... *H02M 3/33592* (2013.01); *H02M 1/08* (2013.01); *H02M 3/335* (2013.01); *H02M 3/33523* (2013.01); *H02M 2001/0058* (2013.01); *Y02B 70/1475* (2013.01); *Y02B 70/1491* (2013.01)

(58) Field of Classification Search
CPC .................................................. H02M 3/335
See application file for complete search history.

(56) References Cited

U.S. PATENT DOCUMENTS

| 2013/0329464 A1* | 12/2013 | Yang ................. | H02M 3/33515 |
| | | | 363/21.02 |
| 2014/0362654 A1* | 12/2014 | Lai ........................ | G11C 29/80 |
| | | | 365/200 |
| 2016/0190942 A1* | 6/2016 | Kikuchi ............ | H02M 3/33507 |
| | | | 363/21.14 |

FOREIGN PATENT DOCUMENTS

JP       2016163475 A       9/2016

* cited by examiner

*Primary Examiner* — Jue Zhang
*Assistant Examiner* — Trinh Q Dang
(74) *Attorney, Agent, or Firm* — Cantor Colburn LLP

(57) ABSTRACT

A synchronous rectification controller includes a first gate pin coupled to a gate of a first synchronous rectification transistor, a first drain pin coupled to a drain of the first synchronous rectification transistor, a second gate pin coupled to a gate of a second synchronous rectification transistor, a second drain pin coupled to a drain of the second synchronous rectification transistor, a source pin coupled to a ground, a multiplexer selecting a voltage applied to the first drain pin in a first state, and selecting a voltage applied to the second drain pin in a second state, a pulse generator generating a pulse signal based on an output voltage of the multiplexer, a driving circuit switching the first synchronous rectification transistor according to the pulse signal in the first state, and switching the second synchronous rectification transistor according to the pulse signal in the second state.

30 Claims, 8 Drawing Sheets

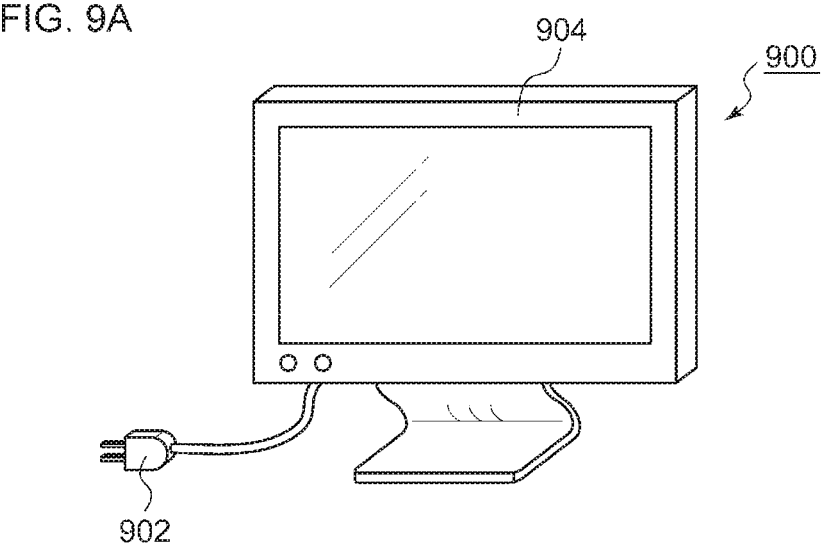
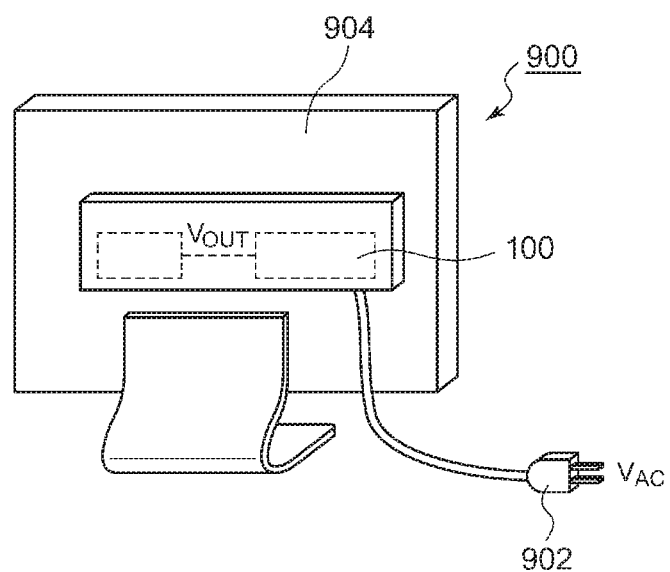

SYNCHRONOUS RECTIFICATION CONTROLLER INCLUDING SYNCHRONOUS RECTIFICATION TRANSISTOR FOR INSULATED SYNCHRONOUS RECTIFICATION DC/DC CONVERTER

CROSS REFERENCE TO RELATED APPLICATIONS

The present invention claims priority under 35 U.S.C. § 119 to Japanese Patent Application 2016-244700 filed on Dec. 16, 2016, the entire contents of which is incorporated herein by reference.

BACKGROUND OF THE INVENTION

1. Field of the Invention

The present invention relates to an insulated synchronous rectification DC/DC converter.

2. Description of the Related Art

An insulated DC/DC converter is employed in various kinds of power supply circuits such as AC/DC converters. In recent years, as such an insulated DC/DC converter, LLC resonant converters have begun to come into commonplace use.

FIG. 1 is a circuit diagram showing an LLC resonant converter. An LLC resonant converter 200R includes a transformer $T_1$, a resonance capacitor $C_r$, an inverter 202, a primary-side controller 300, rectifier diodes $D_{21}$ and $D_{22}$, and an output capacitor $C_1$. $L_r$ represents a leakage inductance of the transformer $T_1$.

The leakage inductance $L_r$, the primary winding $W_1$, and the resonance capacitor $C_r$ form an LLC series resonance circuit. The inverter 202 is configured as a half-bridge circuit including a high-side transistor $M_{11}$ and a low-side transistor $M_{12}$. The inverter 202 receives a DC voltage $V_{IN}$, and applies an AC driving signal across the series resonance circuit.

The rectifier diodes $D_{21}$ and $D_{22}$ are coupled to secondary windings $W_{21}$ and $W_{22}$ of the transformer $T_1$, respectively. The LLC resonant converter 202R supplies the output voltage $V_{OUT}$ generated across the output capacitor $C_1$ to an unshown load.

The primary-side controller 300 receives a feedback signal $V_{FB}$ that corresponds to the output voltage $V_{OUT}$, and feedback controls the inverter 202 such that the output voltage $V_{OUT}$ approaches a target voltage $V_{OUT(REF)}$ thereof. For example, the primary-side controller 300 adjusts the output voltage $V_{OUT}$ by adjusting the switching frequency of the inverter 202.

In order to provide the LLC resonant converter with improved efficiency, a synchronous rectification method, in which the rectifier diodes $D_{21}$ and $D_{22}$ on the secondary side are replaced by MOSFETs, is effective. In a case of employing the synchronous rectification method, this arrangement requires a synchronous rectification controller that controls the switching operation of the synchronous rectification transistors on the secondary side. This involves an increased mounting area (circuit area).

SUMMARY OF THE INVENTION

The present invention has been made in view of such a situation. Accordingly, it is an exemplary purpose of an embodiment of the present invention to provide a compact-size synchronous rectification controller.

An embodiment of the present invention relates to a synchronous rectification controller for an insulated synchronous rectification DC/DC converter. The synchronous rectification controller comprises: a first gate pin to be coupled to a gate of a first synchronous rectification transistor; a first drain pin to be coupled to a drain of the first synchronous rectification transistor; a second gate pin to be coupled to a gate of a second synchronous rectification transistor; a second drain pin to be coupled to a drain of the second synchronous rectification transistor; a source pin to be coupled to a ground; a multiplexer structured to select a voltage applied to the first drain pin in a first state, and to select a voltage applied to the second drain pin in a second state; a pulse generator structured to generate a pulse signal based on an output voltage of the multiplexer; a driving circuit structured to switch on and off the first synchronous rectification transistor according to the pulse signal in the first state, and to switch on and off the second synchronous rectification transistor according to the pulse signal in the second state; and a phase controller structured to switch a state between the first state and the second state.

With this embodiment, two driving systems including the first synchronous rectification transistor and the second synchronous rectification transistor share a single pulse generator. This allows the circuit area of the synchronous rectification controller to be reduced, thereby allowing the circuit area of the DC/DC converter to be reduced.

The pulse generator may comprise: a set comparator structured to compare an output voltage of the multiplexer with a first threshold value, and to generate a set signal; a reset comparator structured to compare the output voltage of the multiplexer with a second threshold value, and to generate a reset signal; and a logic circuit structure to generate the pulse signal that is switched to an on level according to the set signal, and that is switched to an off level according to the reset signal. This allows an area that corresponds to the two comparators and the single logic circuit to be reduced.

The driving circuit may comprise: a first driver structured to drive the first synchronous rectification transistor; a second driver structured to drive the second synchronous rectification transistor; and a demultiplexer structured to supply the pulse signal to the first driver and to supply an off-level signal to the second driver in the first state, and to supply the pulse signal to the second driver and to supply an off-level signal to the first driver in the second state.

The phase controller may switch a state between the first state and the second state according to an edge of the pulse signal that corresponds to turn-off states of the first synchronous rectification transistor and the second synchronous rectification transistor. This arrangement is capable of preventing the first synchronous rectification transistor and the second synchronous rectification transistor from turning on at the same time.

The phase controller may comprise a flip-flop structured to receive an inverted signal of the pulse signal via a clock terminal thereof, and to receive an inverted output of the flip-flop itself via an input terminal thereof. Also, the phase controller may be structured to switch a state between the first state and the second state according to a state of the flip-flop.

The synchronous rectification controller may monolithically be integrated on a single semiconductor substrate. Examples of such an "integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By integrating the circuit on a single chip, such an arrangement allows the circuit area to be reduced, and allows the circuit elements to have uniform characteristics.

Another embodiment of the present invention relates to an insulated synchronous rectification DC/DC converter. The insulated synchronous rectification DC/DC converter may comprise the aforementioned synchronous rectification controller.

Yet another embodiment of the present invention relates to an insulated synchronous rectification DC/DC converter. The insulated synchronous rectification DC/DC converter comprises: a transformer comprising a primary winding and a secondary winding; a resonance capacitor coupled in series with the primary winding; an inverter structured to apply an AC voltage to a series connection of the primary winding and the resonance capacitor; a first synchronous rectification transistor and a second synchronous rectification transistor coupled to the secondary winding; a multiplexer structured to select a drain voltage of the first synchronous rectification transistor in a first state, and to select a drain voltage of the second synchronous rectification transistor in a second state; a pulse generator structured to generate a pulse signal based on an output voltage of the multiplexer; a driving circuit structured to switch on and off the first synchronous rectification transistor according to the pulse signal in the first state, and to switch on and off the second synchronous rectification transistor according to the pulse signal in the second state; and a phase controller structured to switch a state between the first state and the second state.

The pulse generator may comprise: a set comparator structured to compare an output voltage of the multiplexer with a first threshold value, and to generate a set signal; a reset comparator structured to compare the output voltage of the multiplexer with a second threshold value, and to generate a reset signal; and a logic circuit structure to generate the pulse signal that is switched to an on level according to the set signal, and that is switched to an off level according to the reset signal.

The driving circuit may comprise: a first driver structured to drive the first synchronous rectification transistor; a second driver structured to drive the second synchronous rectification transistor; and a demultiplexer structured to supply the pulse signal to the first driver and to supply an off-level signal to the second driver in the first state, and to supply the pulse signal to the second driver and to supply an off-level signal to the first driver in the second state.

The phase controller may switch a state between the first state and the second state according to an edge of the pulse signal that corresponds to turn-off states of the first synchronous rectification transistor and the second synchronous rectification transistor. This arrangement is capable of preventing the first synchronous rectification transistor and the second synchronous rectification transistor from turning on at the same time.

The phase controller may comprise a flip-flop structured to receive an inverted signal of the pulse signal via a clock terminal thereof, and to receive an inverted output of the flip-flop itself via an input terminal thereof. Also, the phase controller may be structured to switch a state between the first state and the second state according to a state of the flip-flop.

One embodiment of the present invention relates to an electronic device. The electronic device comprises: a load; a diode rectifier circuit structured to full-wave rectify a commercial AC voltage; a smoothing capacitor structured to smooth an output voltage of the diode rectifier circuit, so as to generate a DC input voltage; and the aforementioned insulated synchronous rectification DC/DC converter structured to step down the DC input voltage, and to supply the DC input voltage thus stepped down to the load.

One embodiment of the present invention relates to a power supply adapter. The power supply adapter comprises: a diode rectifier circuit structured to full-wave rectify a commercial AC voltage; a smoothing capacitor structured to smooth an output voltage of the diode rectifier circuit, so as to generate a DC input voltage; and the aforementioned insulated synchronous rectification DC/DC converter structured to step down the DC input voltage, and to supply the DC input voltage thus stepped down to a load.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 9A and 9B are diagrams each showing an electronic device including an AC/DC converter.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled to the member B" includes a state in which the member A is indirectly coupled to the member B via another member that does not substantially affect the electric connection between them, or that does not damage the functions of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions of the connection between them, in addition to a state in which they are directly coupled.

Figure 1:
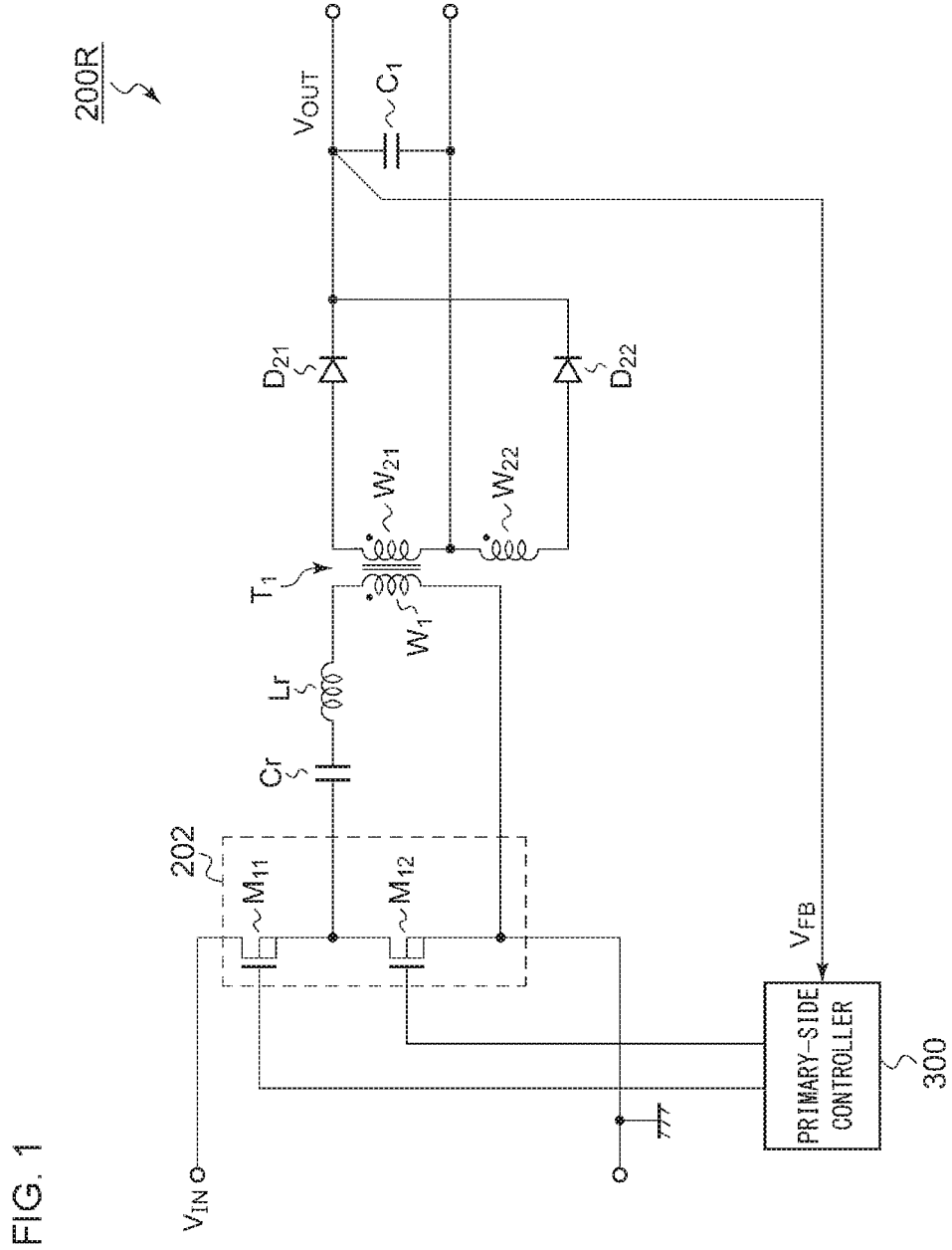
FIG. 1 is a circuit diagram showing an LLC resonant converter.
Figure 2:
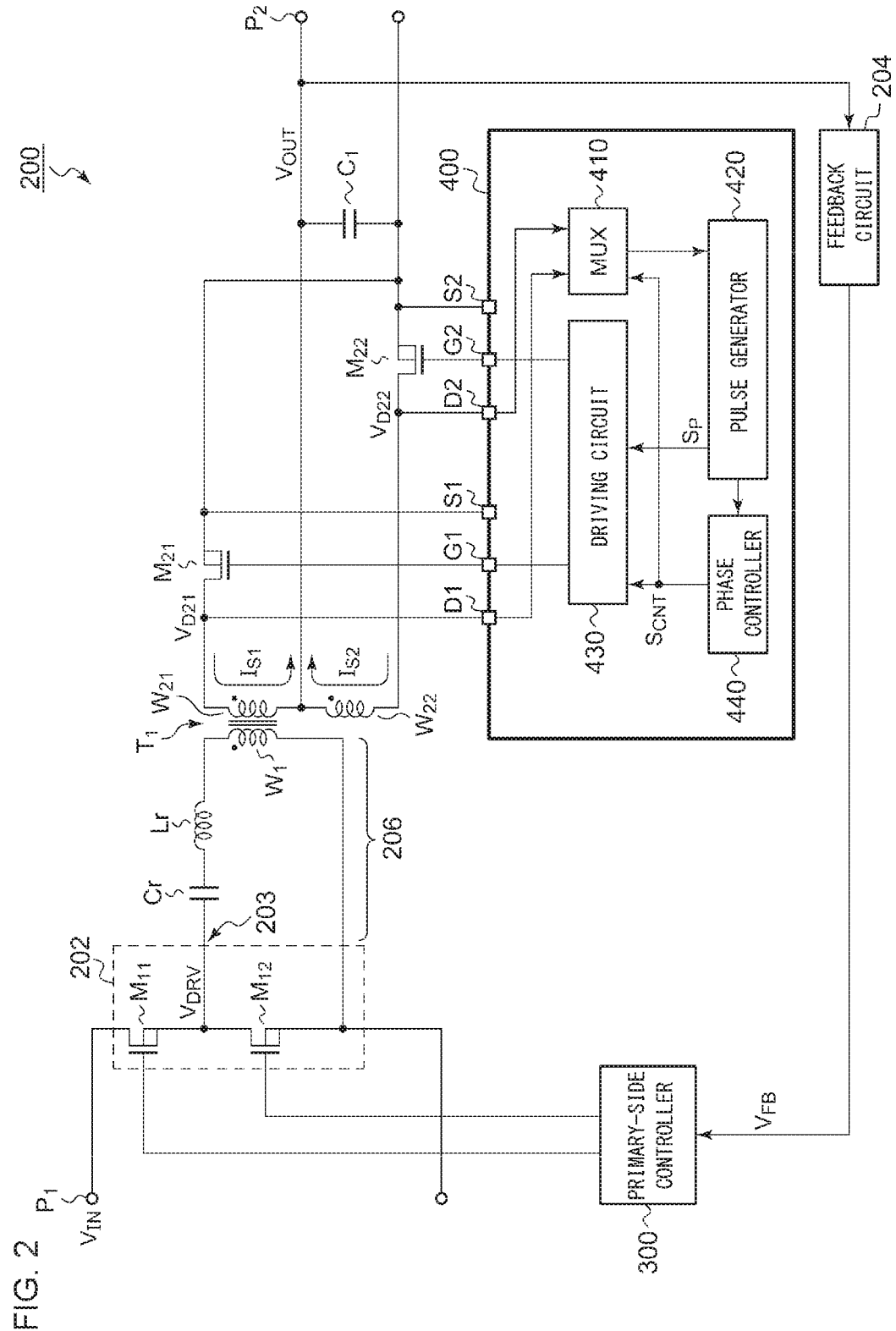
FIG. 2 is a circuit diagram showing an insulated DC/DC converter according to an embodiment.

FIG. 2 is a circuit diagram showing an insulated DC/DC converter 200 according to one embodiment. The DC/DC converter 200 is configured as an LLC resonant converter, for example. The DC/DC converter 200 receives an input voltage $V_{IN}$ via its input terminal $P_1$, generates a DC output voltage $V_{OUT}$ stabilized to a predetermined target voltage, and supplies the output voltage $V_{OUT}$ thus generated to a load (not shown) coupled to its output terminal $P_2$.

The DC/DC converter 200 is configured as a synchronous rectification converter. The DC/DC converter 200 includes an inverter 202, a feedback circuit 204, a resonance capacitor $C_r$, a transformer $T_1$, synchronous rectification transistors $M_{21}$ and $M_{22}$, an output capacitor $C_1$, a primary-side controller 300, and a synchronous rectification controller (secondary-side controller) 400.

The transformer $T_1$ includes a primary winding $W_1$ and secondary windings $W_{21}$ and $W_{22}$. On the primary side of the DC/DC converter 200, the resonance capacitor $C_r$, the leakage inductance $L_r$ of the transformer $T_1$, and the primary winding $W_1$ of the transformer $T_1$ form an LLC series resonance circuit 206. The inverter 202 is configured as a half-bridge circuit including a high-side transistor $M_{11}$ and a low-side transistor $M_{12}$. The output 203 of the inverter 202 is coupled to the series resonance circuit 206. The inverter 202 applies an AC driving voltage $V_{DRV}$ across the series resonance circuit 206.

The first synchronous rectification transistor $M_{21}$ is arranged such that its source is grounded and its drain is coupled to one end of the secondary winding $W_{21}$. Similarly, the second synchronous rectification transistor $M_{22}$ is arranged such that its source is grounded and its drain is coupled to one end of the secondary winding $W_{22}$. A connection node that connects the two secondary windings $W_{21}$ and $W_{22}$ is coupled to the output terminal $P_2$. The output capacitor $C_1$ is arranged between the output terminal $P_2$ and the ground.

The synchronous rectification controller 400 is configured as an IC (Integrated Circuit) monolithically integrated on a single semiconductor substrate. The synchronous rectification controller 400 drives the first synchronous rectification transistor $M_{21}$ and the second synchronous rectification transistor $M_{22}$.

The feedback circuit 204 generates a feedback voltage $V_{FB}$ that corresponds to the output voltage $V_{OUT}$ of the DC/DC converter 200. The primary-side controller 300 receives the feedback voltage $V_{FB}$, and controls the inverter 202 such that the output voltage $V_{OUT}$ matches a target voltage $V_{OUT(REF)}$ thereof. The feedback circuit 204 and the primary-side controller 300 may preferably be configured using known techniques. The configuration and the control method thereof are not restricted in particular.

For example, the feedback circuit 204 can be configured as a combination of a shunt regulator and a photocoupler. The shunt regulator generates a cathode current that corresponds to the difference between the output voltage $V_{OUT}$ and the reference voltage. The photocoupler may be coupled such that the cathode current generated by the shunt regulator flows as a forward current, and such that a feedback voltage $V_{FB}$ that corresponds to a collector current that flows through a light-receiving element of the photocoupler is generated. The primary-side controller 300 may drive the inverter 202 with a switching frequency that corresponds to the feedback voltage $V_{FB}$.

The above is the overall configuration of the DC/DC converter 200. Next, description will be made regarding a configuration of the synchronous rectification controller 400. The synchronous rectification controller 400 includes a first gate pin G1, a second gate pin G2, a first drain pin D1, a second drain pin D2, a first source pin S1, and a second source pin S2.

The first gate pin G1 and the second gate pin G2 are coupled to the gate of the first synchronous rectification transistor $M_{21}$ and the gate of the second synchronous rectification transistor $M_{22}$, respectively. Furthermore, the first source pin S1 and the second source pin S2 are coupled to the source of the first synchronous rectification transistor $M_{21}$ and the source of the second synchronous rectification transistor $M_{22}$, respectively. The electric potential at the first source pin S1 is equal to that at the second source pin S2 in an equivalent circuit. However, in a case in which the wiring has non-negligible impedance, it is assumed that there is a difference in the electric potential between the first source pin S1 and the second source pin S2. The electric potentials at the first source pin S1 and the second source pin S2 are represented hereafter by $V_{GND1}$ and $V_{GND2}$, respectively.

In a case in which the wiring impedance between the source of the first synchronous rectification transistor $M_{21}$ and the source of the second synchronous rectification transistor $M_{22}$ is sufficiently small and has only negligible effects, only a single source pin may preferably be provided to the synchronous rectification controller 400. Also, the single source pin may preferably be grounded.

The synchronous rectification controller 400 includes a multiplexer 410, a pulse generator 420, a driving circuit 430, and a phase controller 440. The synchronous rectification controller 400 alternately switches between a first stat $\phi_1$ and a second state $\phi_2$.

The multiplexer 410 is configured as a selector having two inputs coupled to the first drain pin D1 and the second drain pin D2. In the first stat $\phi_1$, the multiplexer 410 selects the voltage at the first drain pin D1, i.e., the drain voltage $V_{D21}$ of the first synchronous rectification transistor $M_{21}$. In the second state $\phi_2$, the multiplexer 410 selects the voltage at the second drain pin D2, i.e., the drain voltage $V_{D22}$ of the second synchronous rectification transistor $M_{22}$.

The pulse modulator 420 generates a pulse signal $S_P$ based on the output voltage $V_D$ of the multiplexer 410.

In the first state $\phi_1$, the driving circuit 430 switches on and off the first synchronous rectification transistor $M_{21}$ according to the pulse signal $S_P$. In the second state $\phi_2$, the driving circuit 430 switches on and off the second synchronous rectification transistor $M_{22}$ according to the pulse signal $S_P$.

The phase controller 440 switches the state between the first stat $\phi_1$ and the second state $\phi_2$. For example, the phase controller 440 generates a control signal $S_{CNT}$ that indicates the first stat $\phi_1$ or the second state $\phi_2$ according to the pulse signal $S_P$. In the present embodiment, the high level of the control signal $S_{CNT}$ is assigned to the first state $\phi_1$, and the low level is assigned to the second state $\phi_2$.

Figure 3:
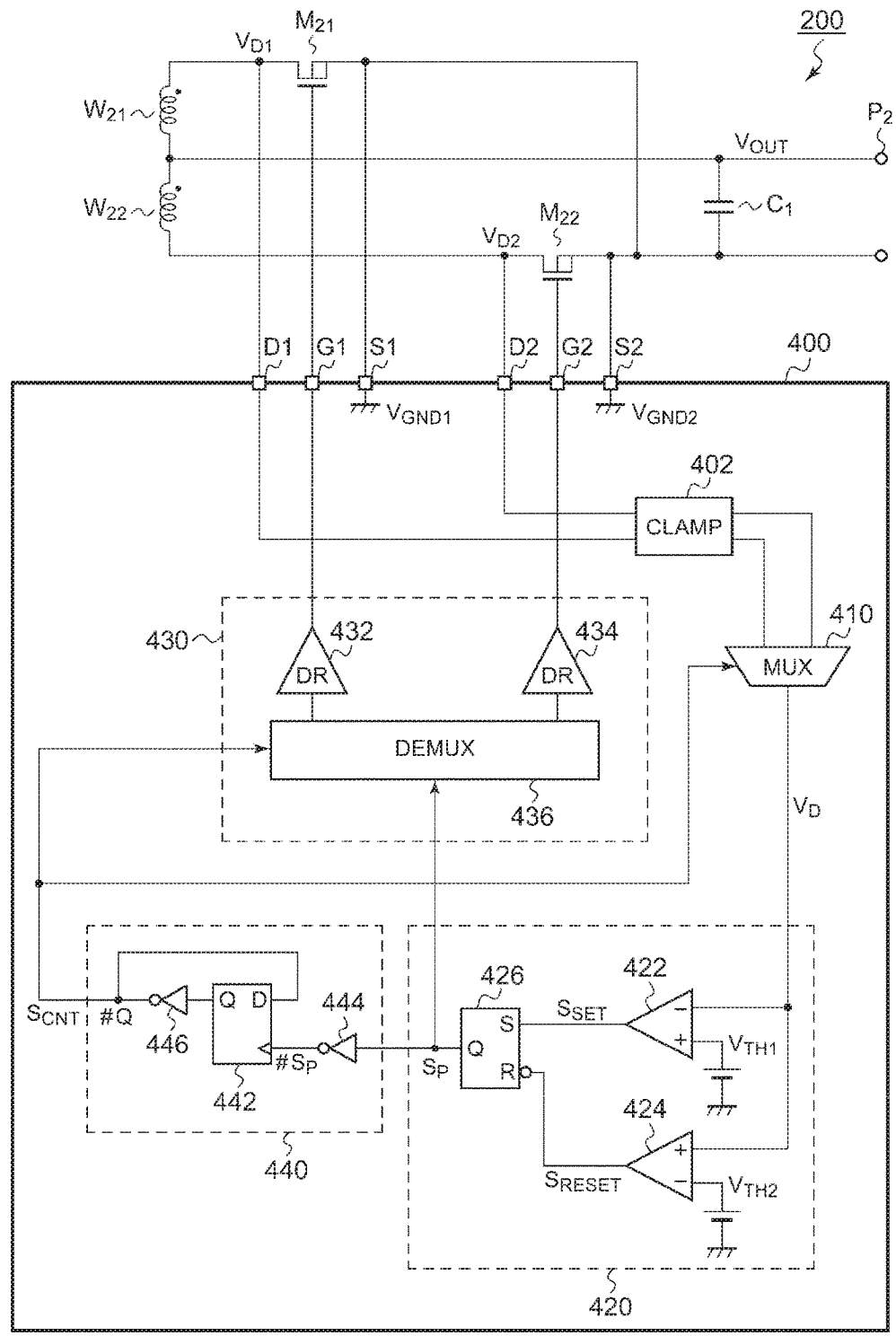
FIG. 3 is a circuit diagram showing a specific example configuration of a synchronous rectification controller.

FIG. 3 is a circuit diagram showing a specific example configuration of the synchronous rectification controller 400. FIG. 3 shows only the secondary side of the DC/DC converter 200.

High voltages, which exceed the breakdown voltage of the synchronous rectification controller 400, are generated at the drain pins D1 and D2. In order to solve such a problem, a clamp circuit 402 is provided on a path from the internal drain pins D1 and D2 of the synchronous rectification controller 400 to the multiplexer 410. The clamp circuit 402 clamps the drain voltages $V_{D1}$ and $V_{D2}$ input to the drain pins D1 and D2 such that they do not exceed an upper limit level designed to be lower than the breakdown voltage of the synchronous rectification controller 400.

The driving circuit 430 includes a first driver 432, a second driver 434, and a demultiplexer 436. The first driver 432 drives the first synchronous rectification transistor $M_{21}$. The second driver 434 drives the second synchronous rectification transistor $M_{22}$. In the first state $\phi_1$, the demultiplexer 436 supplies the pulse signal $S_P$ generated by the pulse generator 420 to the first driver 432, and supplies an off-level signal to the second driver 434. On the other hand, in the second state $\phi_2$, the demultiplexer 436 supplies the pulse signal $S_P$ to the second driver 434, and supplies an off-level signal to the first driver 432.

The pulse generator 420 includes a set comparator 422, a reset comparator 424, and a logic circuit 426. The set comparator 422 compares the output voltage of the multiplexer 410 (which will also be referred to simply as the "drain voltage") $V_D$ with a first threshold value $V_{TH1}$, so as to generate a set signal $S_{SET}$. The first threshold value $V_{TH1}$ is configured as a negative voltage, which may be set to a voltage on the order of −150 mV, for example. When the drain voltage $V_D$ crosses the first threshold value $V_{TH1}$ from an upper value to a lower value, i.e., when $V_D$ becomes lower than $V_{TH1}$, the set signal $S_{SET}$ is asserted (set to the high level, for example).

The reset comparator 424 compares the drain voltage $V_D$ with a second threshold value $V_{TH2}$, and generates a reset signal $S_{RESET}$. The second threshold value $V_{TH2}$ is a negative voltage in the vicinity of zero that is designed to be higher than the first threshold value $V_{TH1}$. The second threshold value $V_{TH2}$ may be set to a voltage on the order of −20 my, for example. When the drain voltage $V_D$ crosses the second threshold value $V_{TH2}$ from a lower value to a higher value, i.e., when $V_D$ becomes higher than $V_{TH2}$, the reset signal $S_{RESET}$ is asserted (set to the high level, for example).

The logic circuit 426 generates the pulse signal $S_P$ that transits to the on level (high level) according to an assertion of the set signal $S_{SET}$, and that transits to the off level (low level) according to an assertion of the reset signal $S_{RESET}$. The logic circuit 426 may be configured as an SR (Set/Reset) flip-flop, for example.

The phase controller 440 alternately switches the state between the first state $\phi_1$ and the second state $\phi_2$ with a negative edge of the pulse signal $S_P$ as a trigger, i.e., with the respective turn-off states of the synchronous rectification transistors $M_{21}$ and $M_{22}$ as triggers.

The phase controller 440 includes a flip-flop 442 and inverters 444 and 446. The inverter 444 inverts the pulse signal $S_P$. The inverter 446 inverts the output Q of the flip-flop 442. The flip-flop 442 receives the inverted signal #$S_P$ of the pulse signal $S_P$ via its clock terminal, and receives the inverted output #Q of the flip-flop 442 itself via its input terminal (D). With this arrangement, the output Q of the flip-flop 442 is inverted every for negative edge of the pulse signal $S_P$. The phase controller 440 switches the state between the first state $\phi_1$ and the second state $\phi_2$ according to the state of the flip-flop 442. In FIG. 3, the output #Q of the inverter 446 is employed as the control signal $S_{CNT}$. However, the present invention is not restricted to such an arrangement. Also, the output Q of the flip-flop 442 may be employed as the control signal $S_{CNT}$.

The above is the configuration of the synchronous rectification controller 400. Next, description will be made regarding the operation of the DC/DC converter 200.

Figure 4:
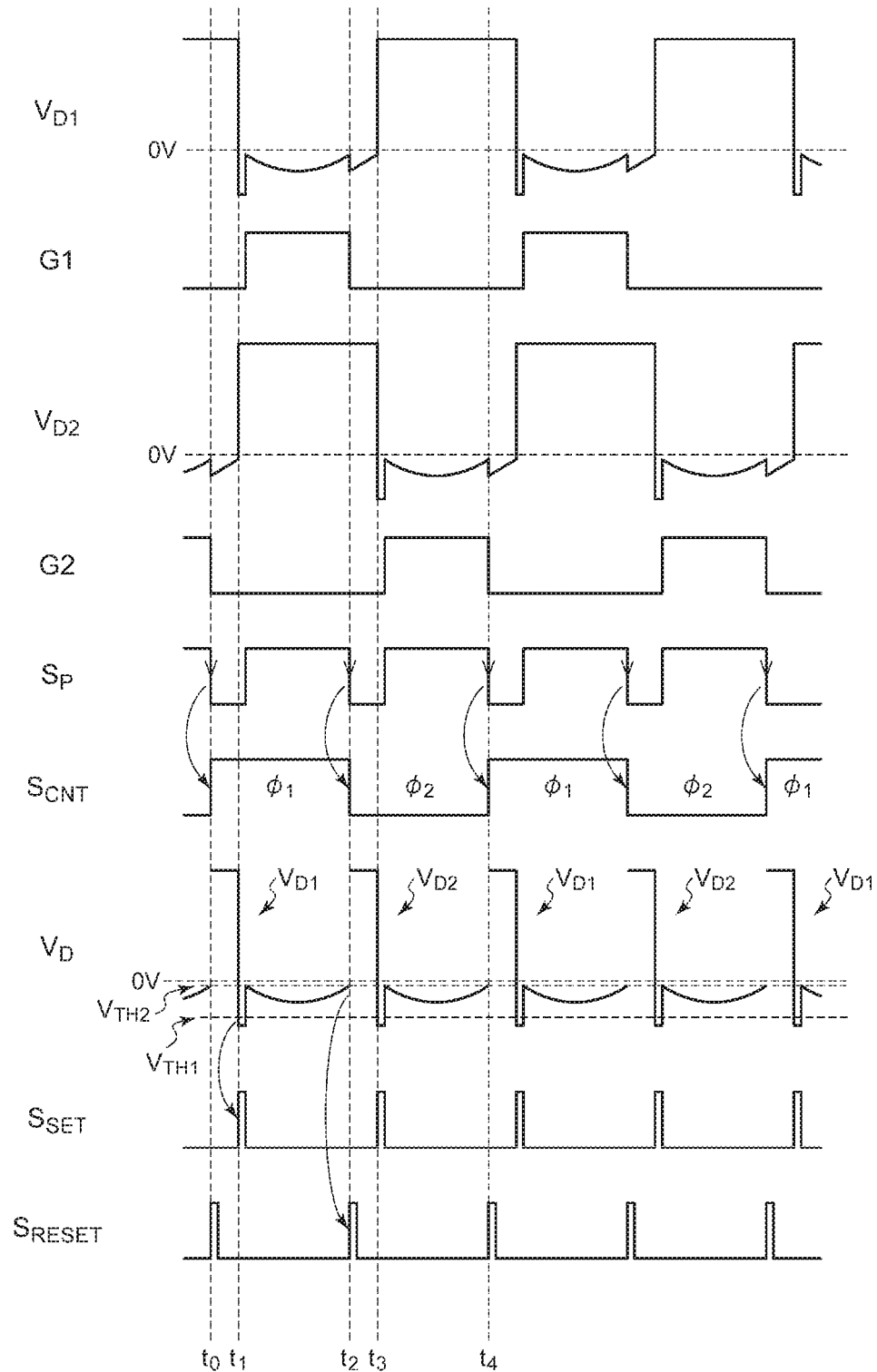
FIG. 4 is an operation waveform diagram showing the operation of the synchronous rectification controller shown in FIG. 3.

FIG. 4 is an operation waveform diagram showing the operation of the synchronous rectification controller 400 shown in FIG. 3. Before the time point $t_0$, the state is set to the second state $\phi_2$. The state is set to the first state $\phi_1$ at the time point $t_0$ with a negative edge of the pulse signal $S_P$ as a trigger, i.e., with the turn-off of the second synchronous transistor $M_{22}$ as a trigger. In the first state $\phi_1$, the output voltage $V_D$ of the multiplexer 410 is equal to the voltage $V_{D1}$ at the first drain pin D1. When the drain voltage $V_D$ (i.e., $V_{D1}$) becomes lower than the first threshold value $V_{TH1}$ at the time point $t_1$, the set signal $S_{SET}$ is asserted, which switches the pulse signal $S_P$ to the on level (high level).

In the first state $\phi_1$, the pulse signal $S_P$ is supplied to the gate of the first synchronous rectification transistor $M_{21}$ via the first gate pin G1, which turns on the first synchronous rectification transistor $M_{21}$. When the first synchronous rectification transistor $M_{21}$ is turned on, a voltage drop $R_{ON1} \times I_{S1}$ occurs across itself. Here, $R_{ON1}$ represents the on resistance of the first synchronous rectification transistor $M_{21}$. The current $I_{S1}$ represents a secondary current that flows through the secondary winding $W_{21}$ and the first synchronous rectification transistor $M_{21}$.

As the secondary current $I_{S1}$ becomes smaller, the drain voltage $V_{D1}$ approaches 0 V. When the drain voltage $V_{D1}$ exceeds the second threshold value $V_{TH2}$ (zero current state) at the time point $t_2$, the reset signal $S_{RESET}$ is asserted, which switches the pulse signal $S_P$ to the off level (low level). This turns off the first synchronous rectification transistor $M_{21}$.

When the pulse signal $S_P$ is switched to the off level, the state is switched to the second state $\phi_2$. In the second state $\phi_2$, the output voltage $V_D$ of the multiplexer 410 is equal to the voltage $V_{D2}$ at the second drain pin D2. When the drain voltage $V_D$ (i.e., $V_{D2}$) becomes lower than the first threshold value $V_{TH1}$ at the time point $t_3$, the set signal $S_{SET}$ is asserted, which switches the pulse signal $S_P$ to the on level (high level).

In the second state $\phi_2$, the pulse signal $S_P$ is supplied to the gate of the second synchronous rectification transistor $M_{22}$ via the second gate pin G2, which turns on the second synchronous rectification transistor $M_{22}$. When the second synchronous rectification transistor $M_{22}$ is turned on, a voltage drop $R_{ON2} \times I_{S2}$ occurs across itself. Here, $R_{ON2}$ represents the on resistance of the second synchronous rectification transistor $M_{22}$. The current $I_{S2}$ represents a secondary current that flows through the secondary winding $W_{22}$ and the second synchronous rectification transistor $M_{22}$.

As the secondary current $I_{S2}$ becomes smaller, the drain voltage $V_{D2}$ becomes closer to 0 V. When the drain voltage $V_{D2}$ exceeds the second threshold value $V_{TH4}$ at the time point $t_4$, the reset signal $S_{RESET}$ is asserted, which switches the pulse signal $S_P$ to the off level (low level). This turns off the second synchronous rectification transistor $M_{22}$.

When the pulse signal $S_P$ is switched to the off level, the state is switched to the first state $\phi_1$. The synchronous rectification controller 400 repeats the operation from the time point $t_0$ to the time point $t_4$.

The above is the operation of the synchronous rectification controller 400. Next, description will be made regarding the advantages thereof.

The advantages of the synchronous rectification controller 400 can be clearly understood in comparison with a comparison technique. With such a comparison technique, two separate pulse generators are provided in order to drive the first synchronous rectification transistor $M_{21}$ and the second synchronous rectification transistor $M_{22}$. By alternately operating the two separate pulse generators, this arrangement provides the same operation as shown in FIG. 4.

With the synchronous rectification controller 400, the pulse generator 420 is configured as a shared pulse generator to drive the two separate driving systems, i.e., the first synchronous rectification transistor $M_{21}$ and the second synchronous rectification transistor $M_{22}$. This allows the circuit area to be reduced as compared with such a comparison technique.

More specifically, with the synchronous rectification controller 400 shown in FIG. 3, a single flip-flop formed of the two comparators 422 and 424 and the logic circuit 426 is configured as a shared component for the two driving systems. The set comparator 422 and the reset comparator 424 are required to operate with high precision. This involves a markedly large circuit area of the set comparator 422 and the reset comparator 424. Accordingly, by allowing the two comparators to be omitted, this provides a markedly large contribution to a reduction in the circuit area.

In addition, in order to provide the set comparator 422 and the reset comparator 424 with improved precision before shipping as a product, in some cases, trimming is performed so as to adjust the offset level for each of the set comparator 422 and the reset comparator 424. With the synchronous rectification controller 400 shown in FIG. 3, the number of the comparators is small as compared with the comparison techniques. This allows the time required for trimming to be reduced.

Furthermore, with the comparison techniques, such an arrangement has the potential to involve a problem in that the first synchronous rectification transistor $M_{21}$ and the second synchronous rectification transistor $M_{22}$ turn on at the same time. Accordingly, such a conventional arrangement requires a timing control operation or a mechanism in order to solve this problem. In contrast, with the synchronous rectification controller 400, the state is switched between the first state $\phi_1$ and the second state $\phi_2$ with the negative edge of the pulse signal $S_P$ as a trigger. This arrangement is capable of preventing the occurrence of a situation in which the first synchronous rectification transistor $M_{21}$ and the second rectification transistor $M_{22}$ turn on at the same time.

Description has been made above regarding the the present invention with reference to the embodiment. The above-described embodiments have been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

Figure 5:
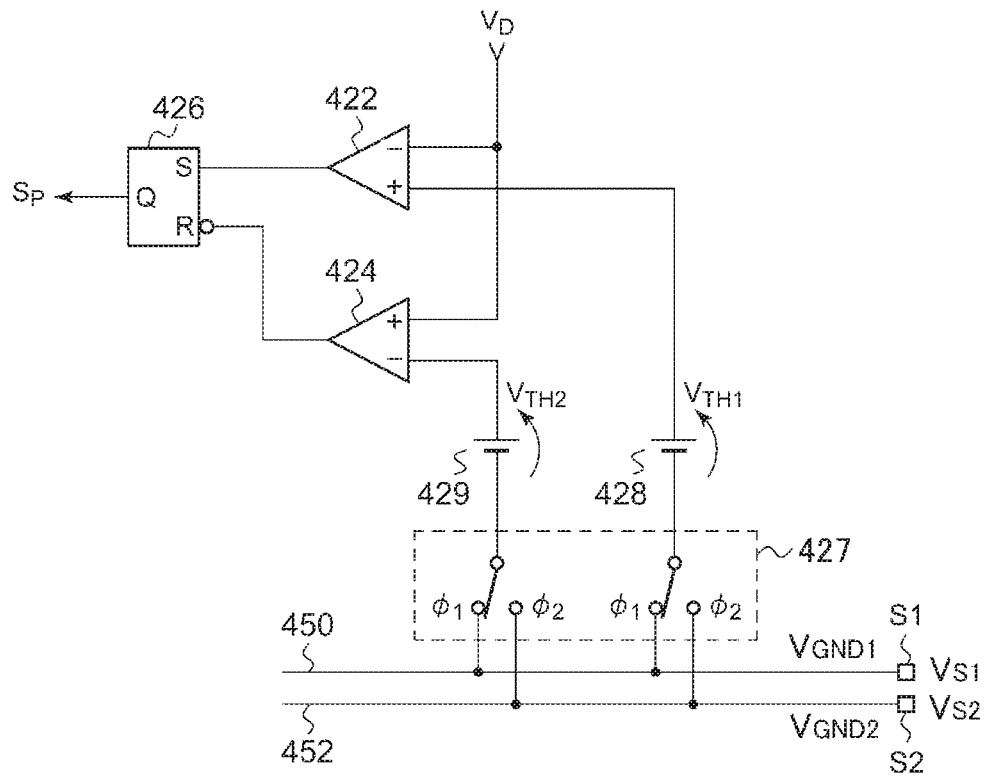
FIG. 5 is a circuit diagram showing a modification of a pulse generator of the synchronous rectification controller.

FIG. 5 is a circuit diagram showing a modification (420A) of the pulse generator of the synchronous rectification controller 400. The synchronization rectification controller 400 includes a first ground plane (ground line) 450 coupled to the first source pin S1 and a second ground plane 452 coupled to the second source pin S2.

Reference voltage sources 428 and 429 are each configured to be selectively coupled to the first ground plane 450 and the second ground plane 452 via a switch 427. In the first state $\phi_1$, the reference voltage sources 428 and 429 are each coupled to the first ground plane 450. In this state, the reference voltage sources 428 and 429 generate the first threshold value VTH1 and the second threshold value $V_{TH2}$ with the source voltage $V_{S1}(V_{GND1})$ of the first synchronous rectification transistor $M_{21}$ as a reference voltage. On the other hand, in the second state $\phi_2$, the reference voltage sources 428 and 429 are each coupled to the second ground plane 452. In this state, the reference voltage sources 428 and 429 generate the first threshold value VTH1 and the second threshold value $V_{TH2}$ with the source voltage $V_{S2}$ ($V_{GND2}$) of the second synchronous rectification transistor $M_{22}$ as a reference voltage.

In the equivalent circuit diagram shown in FIG. 3, the source of the first synchronous rectification transistor $M_{21}$ and the source of the second synchronous rectification transistor $M_{22}$ are set to the same electric potential. That is to say, the relation $V_{S1}=V_{S2}(V_{GND1}=V_{GND2})$ holds true. However, in an actual circuit on a printed circuit board, in some cases, a non-negligible impedance occurs between them. This leads to a non-negligible voltage difference between them. With the modification shown in FIG. 5, in the first state $\phi_1$, this arrangement is capable of accurately comparing the drain-source voltage of the first synchronous rectification transistor $M_{21}$ with the threshold values $V_{TH1}$ and $V_{TH2}$. In the same way, in the second state $\phi_2$, this arrangement is capable of accurately comparing the drain-source voltage of the second synchronous rectification transistor $M_{22}$ with the threshold values $V_{TH1}$ and $V_{TH2}$. This allows the zero-current state on the secondary side to be accurately detected.

Second Modification

Figure 6:
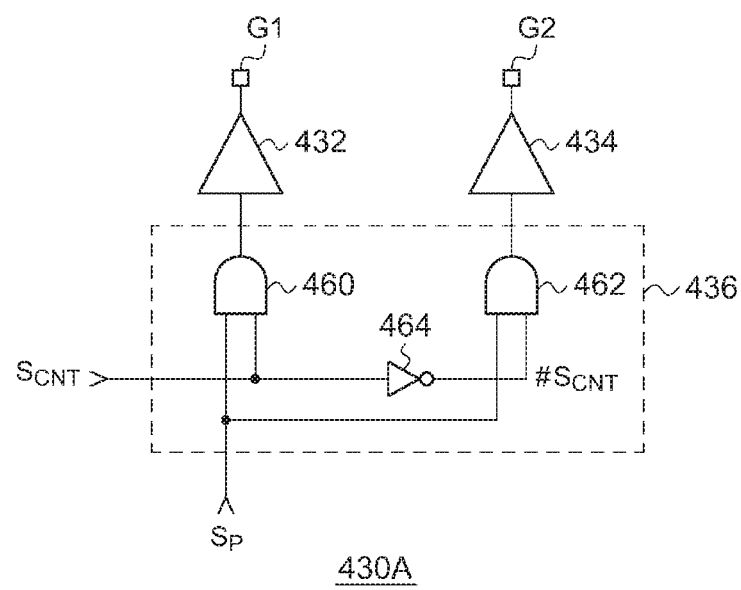
FIG. 6 is a circuit diagram showing a modification of a driving circuit.

FIG. 6 is a circuit diagram showing an example configuration (430A) of the driving circuit 430. The demultiplexer 436 includes AND gates 460 and 462 and an inverter 464. The inverter 464 inverts the control signal $S_{CNT}$. The first AND gate 460 generates a logical AND of the pulse signal $S_P$ and the control signal $S_{CNT}$, and outputs the logical AND thus generated to the first driver 432. The second AND gate 462 generates a logical AND of the pulse signal $S_P$ and the inverted signal #$S_{CNT}$ of the control signal $S_{CNT}$, and outputs the logical AND thus generated to the second driver 434.

Third Modification

The primary-side controller 300 may be arranged on the secondary side of the DC/DC converter 200. Also, the primary-side controller 300 may include a pulse modulator that generates a pulse signal having a frequency adjusted such that the output voltage $V_{OUT}$ matches a target voltage thereof. Also, the primary-side controller 300 may be coupled to the gates of the high-side transistor $M_{11}$ and the low-side transistor $M_{12}$ of the inverter 202 via a pulse transformer. With such an arrangement, the primary-side controller 300 may supply a gate driving signal that corresponds to the pulse signal to the gates of the high-side transistor $M_{11}$ and the low-side transistor $M_{12}$. In this case, the primary-side controller 300 and the synchronous rectification controller 400 may be integrally formed as a single IC.

Fourth Modification

The coupling topology between the inverter 202 and the series resonance circuit 206 is not restricted to such an arrangement shown in FIG. 2. For example, the series resonance circuit 206 may be arranged between the input terminal $P_1$ and the output terminal 203 of the inverter 202. Also, the inverter 202 may be configured as a full-bridge inverter.

Fifth Modification

The first synchronous rectification transistor $M_{21}$ and the second synchronous rectification transistor $M_{22}$ may be built into a single package together with the synchronous rectification controller 400.

Application

Figure 7:
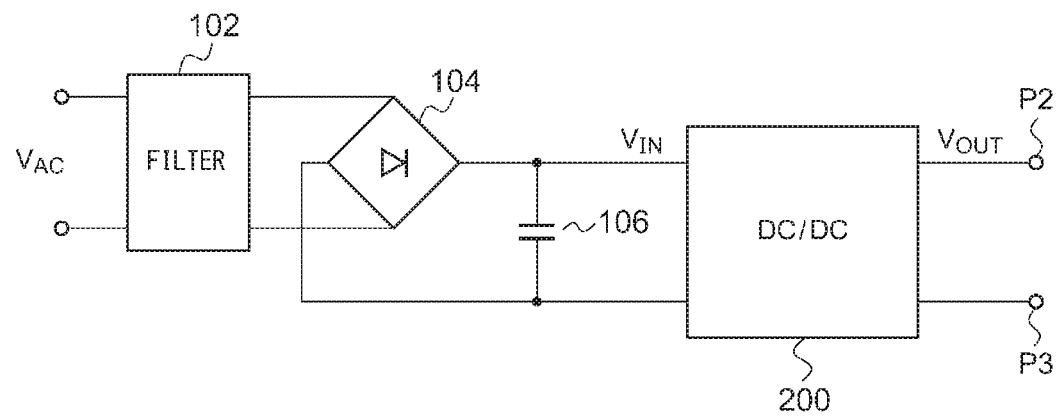
FIG. 7 is a circuit diagram showing an AC/DC converter including a DC/DC converter.

Next, description will be made regarding the application of the DC/DC converter 200 described in the embodiment. The DC/DC converter 200 may be employed in an AC/DC converter 100. FIG. 7 is a circuit diagram showing the AC/DC converter 100 including the DC/DC converter 200.

The AC/DC converter 100 includes a filter 102, a rectifier circuit 104, a smoothing capacitor 106, and the DC/DC converter 200. The filter 102 removes noise included in the AC voltage $V_{AC}$. The rectifier circuit 104 is configured as a diode bridge circuit that full-wave rectifies the AC voltage $V_{AC}$. The smoothing capacitor 106 smoothes the voltage thus full-wave rectified, so as to generate a DC voltage $V_{in}$. The DC/DC converter 200 receives the DC voltage $V_{IN}$, and generates an output voltage $V_{OUT}$. A power factor correction circuit may be arranged between the rectifier circuit 104 and the DC/DC converter 200.

Figure 8:
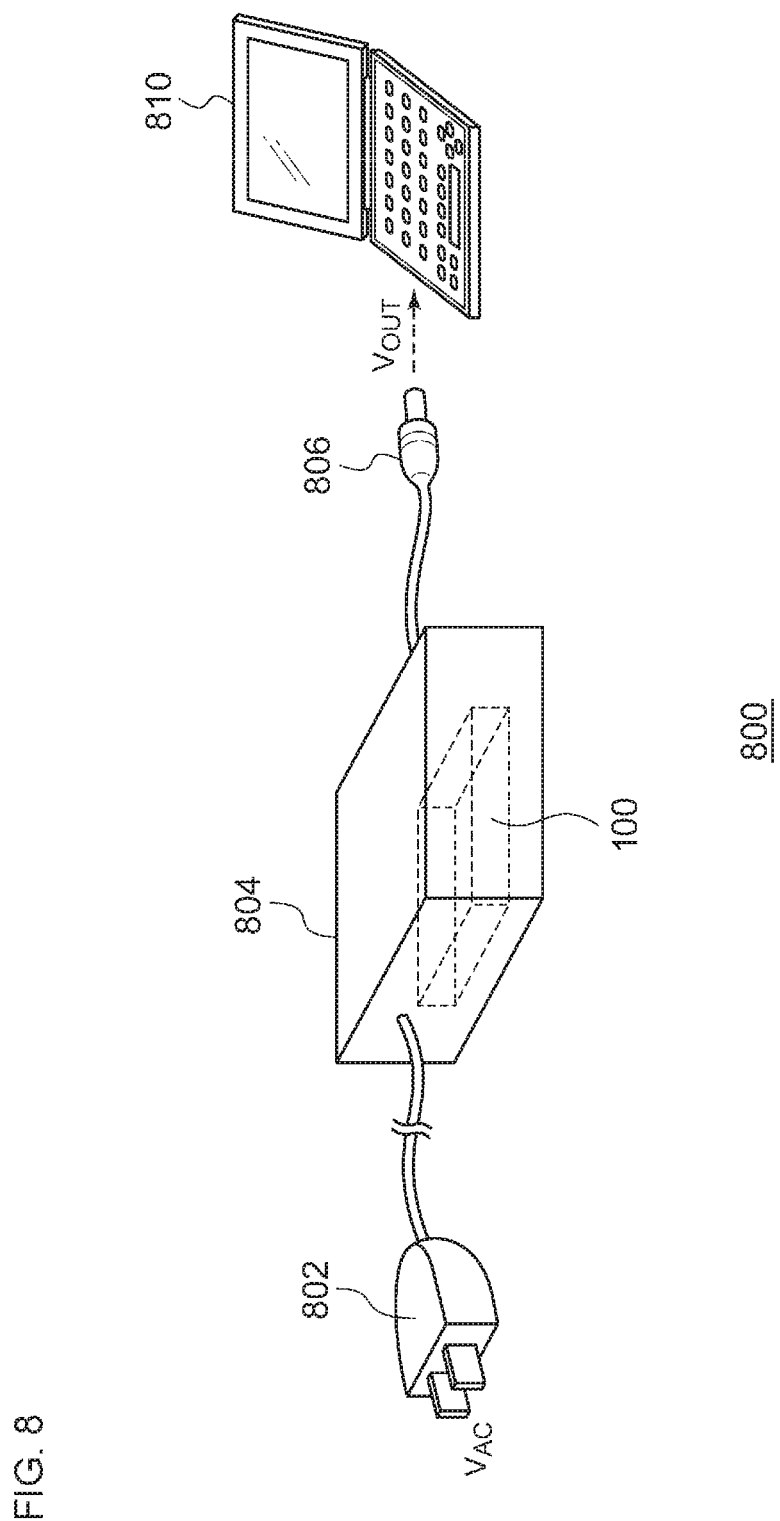
FIG. 8 is a diagram showing an AC adapter including an AC/DC converter.

FIG. 8 is a diagram showing an AC adapter 800 including the AC/DC converter 100. The AC adapter 800 includes a plug 802, a housing 804, and a connector 806. The plug 802 receives a commercial AC voltage $V_{AC}$ from an unshown electrical outlet. The AC/DC converter 100 is mounted within the housing 804. The DC output voltage $V_{OUT}$ generated by the AC/DC converter 100 is supplied from the connector 806 to an electronic device 810. Examples of the electronic device 810 include laptop computers, digital still cameras, digital video cameras, cellular phones, portable audio players, and the like.

FIGS. 9A and 9B are diagrams each showing an electronic device 900 including the AC/DC converter 100. The electronic devices 900 shown in FIGS. 9A and 9B are each configured as a display apparatus. However, the electronic device 900 is not particularly restricted in kind, as long as it includes a power supply apparatus as an internal component. Examples of the electronic device 900 include audio devices, refrigerators, washing machines, vacuum cleaners, etc.

A plug 902 receives commercial AC voltage $V_{AC}$ from an unshown electrical outlet. The AC/DC converter 100 is mounted within the housing 904. The DC output voltage $V_{OUT}$ generated by the AC/DC converter 100 is supplied to loads mounted within the same housing 904, examples of which include a microcomputer, DSP (Digital Signal Processor), power supply circuit, illumination device, analog circuit, digital circuit, etc.

While the preferred embodiments of the present invention have been described using specific terms, such description is for illustrative purposes only, and it is to be understood that changes and variations may be made without departing from the spirit or scope of the appended claims.

What is claimed is:

1. A synchronous rectification controller for an insulated synchronous rectification DC/DC converter, comprising:
    a first gate pin to be coupled to a gate of a first synchronous rectification transistor;
    a first drain pin to be coupled to a drain of the first synchronous rectification transistor;
    a second gate pin to be coupled to a gate of a second synchronous rectification transistor;
    a second drain pin to be coupled to a drain of the second synchronous rectification transistor;
    a source pin to be coupled to a ground;
    a multiplexer structured to select a voltage applied to the first drain pin in a first state, and to select a voltage applied to the second drain pin in a second state;
    a pulse generator structured to generate a pulse signal based on an output voltage of the multiplexer;
    a driving circuit structured to switch on and off the first synchronous rectification transistor according to the pulse signal in the first state, and to switch on and off the second synchronous rectification transistor according to the pulse signal in the second state; and
    a phase controller structured to switch a state between the first state and the second state,
    wherein the driving circuit comprises:
    a first driver structured to drive the first synchronous rectification transistor;
    a second driver structured to drive the second synchronous rectification transistor; and
    a demultiplexer structured to supply the pulse signal to the first driver and to supply an off-level signal to the second driver in the first state, and to supply the pulse signal to the second driver and to supply an off-level signal to the first driver in the second state.

2. The synchronous rectification controller according to claim 1, monolithically integrated on a single semiconductor substrate.

3. An insulated synchronous rectification DC/DC converter comprising the synchronous rectification controller according to claim 1.

4. An electronic device comprising:
    a load;
    a diode rectifier circuit structured to full-wave rectify a commercial AC voltage;
    a smoothing capacitor structured to smooth an output voltage of the diode rectifier circuit, so as to generate a DC input voltage; and
    the DC/DC converter according to claim 3, structured to step down the DC input voltage, and to supply the DC input voltage thus stepped down to the load.

5. A power supply adapter comprising:
    a diode rectifier circuit structured to full-wave rectify a commercial AC voltage;
    a smoothing capacitor structured to smooth an output voltage of the diode rectifier circuit, so as to generate a DC input voltage; and
    the DC/DC converter according to claim 3, structured to step down the DC input voltage, and to supply the DC input voltage thus stepped down to a load.

6. The insulated synchronous rectification DC/DC converter according to claim 3, further comprising:
    a transformer comprising a primary winding and a secondary winding;
    a resonance capacitor coupled in series with the primary winding;
    an inverter structured to apply an AC voltage to a series connection of the primary winding and the resonance capacitor;
    a first synchronous rectification transistor and a second synchronous rectification transistor coupled to the secondary winding.

7. A synchronous rectification controller for an insulated synchronous rectification DC/DC converter, comprising:

a first gate pin to be coupled to a gate of a first synchronous rectification transistor;
a first drain pin to be coupled to a drain of the first synchronous rectification transistor;
a second gate pin to be coupled to a gate of a second synchronous rectification transistor;
a second drain pin to be coupled to a drain of the second synchronous rectification transistor;
a source pin to be coupled to a ground;
a multiplexer structured to select a voltage applied to the first drain pin in a first state, and to select a voltage applied to the second drain pin in a second state;
a pulse generator structured to generate a pulse signal based on an output voltage of the multiplexer;
a driving circuit structured to switch on and off the first synchronous rectification transistor according to the pulse signal in the first state, and to switch on and off the second synchronous rectification transistor according to the pulse signal in the second state; and
a phase controller structured to switch a state between the first state and the second state, wherein the pulse generator comprises:
a set comparator structured to compare an output voltage of the multiplexer with a first threshold value, and to generate a set signal;
a reset comparator structured to compare the output voltage of the multiplexer with a second threshold value, and to generate a reset signal; and
a logic circuit structure to generate the pulse signal that is switched to an on level according to the set signal, and that is switched to an off level according to the reset signal.

8. The synchronous rectification controller according to claim 7, monolithically integrated on a single semiconductor substrate.

9. An insulated synchronous rectification DC/DC converter comprising the synchronous rectification controller according to claim 7.

10. The insulated synchronous rectification DC/DC converter according to claim 9, further comprising:
a transformer comprising a primary winding and a secondary winding;
a resonance capacitor coupled in series with the primary winding;
an inverter structured to apply an AC voltage to a series connection of the primary winding and the resonance capacitor;
a first synchronous rectification transistor and a second synchronous rectification transistor coupled to the secondary winding.

11. An electronic device comprising:
a load;
a diode rectifier circuit structured to full-wave rectify a commercial AC voltage;
a smoothing capacitor structured to smooth an output voltage of the diode rectifier circuit, so as to generate a DC input voltage; and
the DC/DC converter according to claim 9, structured to step down the DC input voltage, and to supply the DC input voltage thus stepped down to the load.

12. A power supply adapter comprising:
a diode rectifier circuit structured to full-wave rectify a commercial AC voltage;
a smoothing capacitor structured to smooth an output voltage of the diode rectifier circuit, so as to generate a DC input voltage; and
the DC/DC converter according to claim 9, structured to step down the DC input voltage, and to supply the DC input voltage thus stepped down to a load.

13. A synchronous rectification controller for an insulated synchronous rectification DC/DC converter, comprising:
a first gate pin to be coupled to a gate of a first synchronous rectification transistor;
a first drain pin to be coupled to a drain of the first synchronous rectification transistor;
a second gate pin to be coupled to a gate of a second synchronous rectification transistor;
a second drain pin to be coupled to a drain of the second synchronous rectification transistor;
a source pin to be coupled to a ground;
a multiplexer structured to select a voltage applied to the first drain pin in a first state, and to select a voltage applied to the second drain pin in a second state;
a pulse generator structured to generate a pulse signal based on an output voltage of the multiplexer;
a driving circuit structured to switch on and off the first synchronous rectification transistor according to the pulse signal in the first state, and to switch on and off the second synchronous rectification transistor according to the pulse signal in the second state; and
a phase controller structured to switch a state between the first state and the second state,
wherein the phase controller switches a state between the first state and the second state according to an edge of the pulse signal that corresponds to turn-off states of the first synchronous rectification transistor and the second synchronous rectification transistor.

14. The synchronous rectification controller according to claim 13, monolithically integrated on a single semiconductor substrate.

15. An insulated synchronous rectification DC/DC converter comprising the synchronous rectification controller according to claim 13.

16. The insulated synchronous rectification DC/DC converter according to claim 15, further comprising:
a transformer comprising a primary winding and a secondary winding;
a resonance capacitor coupled in series with the primary winding;
an inverter structured to apply an AC voltage to a series connection of the primary winding and the resonance capacitor;
a first synchronous rectification transistor and a second synchronous rectification transistor coupled to the secondary winding.

17. An electronic device comprising:
a load;
a diode rectifier circuit structured to full-wave rectify a commercial AC voltage;
a smoothing capacitor structured to smooth an output voltage of the diode rectifier circuit, so as to generate a DC input voltage; and
the DC/DC converter according to claim 15, structured to step down the DC input voltage, and to supply the DC input voltage thus stepped down to the load.

18. A power supply adapter comprising:
a diode rectifier circuit structured to full-wave rectify a commercial AC voltage;
a smoothing capacitor structured to smooth an output voltage of the diode rectifier circuit, so as to generate a DC input voltage; and the DC/DC converter according to claim 15, structured to step down the DC input voltage, and to supply the DC input voltage thus stepped down to a load.

19. A synchronous rectification controller for an insulated synchronous rectification DC/DC converter, comprising:
a first gate pin to be coupled to a gate of a first synchronous rectification transistor;
a first drain pin to be coupled to a drain of the first synchronous rectification transistor;
a second gate pin to be coupled to a gate of a second synchronous rectification transistor;
a second drain pin to be coupled to a drain of the second synchronous rectification transistor;
a source pin to be coupled to a ground;
a multiplexer structured to select a voltage applied to the first drain pin in a first state, and to select a voltage applied to the second drain pin in a second state;
a pulse generator structured to generate a pulse signal based on an output voltage of the multiplexer;
a driving circuit structured to switch on and off the first synchronous rectification transistor according to the pulse signal in the first state, and to switch on and off the second synchronous rectification transistor according to the pulse signal in the second state; and
a phase controller structured to switch a state between the first state and the second state,
wherein the phase controller comprises a flip-flop having a clock terminal coupled to receive an inverted signal of the pulse signal, and an input terminal coupled to receive an inverted output of the flip-flop,
and wherein the phase controller is structured to switch a state between the first state and the second state according to a state of the flip-flop.

20. The synchronous rectification controller according to claim 19, monolithically integrated on a single semiconductor substrate.

21. An insulated synchronous rectification DC/DC converter comprising the synchronous rectification controller according to claim 19.

22. The insulated synchronous rectification DC/DC converter according to claim 21, further comprising:
a transformer comprising a primary winding and a secondary winding;
a resonance capacitor coupled in series with the primary winding;
an inverter structured to apply an AC voltage to a series connection of the primary winding and the resonance capacitor;
a first synchronous rectification transistor and a second synchronous rectification transistor coupled to the secondary winding.

23. An electronic device comprising:
a load;
a diode rectifier circuit structured to full-wave rectify a commercial AC voltage;
a smoothing capacitor structured to smooth an output voltage of the diode rectifier circuit, so as to generate a DC input voltage; and
the DC/DC converter according to claim 21, structured to step down the DC input voltage, and to supply the DC input voltage thus stepped down to the load.

24. A power supply adapter comprising:
a diode rectifier circuit structured to full-wave rectify a commercial AC voltage;
a smoothing capacitor structured to smooth an output voltage of the diode rectifier circuit, so as to generate a DC input voltage; and
the DC/DC converter according to claim 21, structured to step down the DC input voltage, and to supply the DC input voltage thus stepped down to a load.

25. A synchronous rectification controller for an insulated synchronous rectification DC/DC converter, comprising:
a first gate pin to be coupled to a gate of a first synchronous rectification transistor;
a first drain pin to be coupled to a drain of the first synchronous rectification transistor;
a second gate pin to be coupled to a gate of a second synchronous rectification transistor;
a second drain pin to be coupled to a drain of the second synchronous rectification transistor;
a source pin to be coupled to a ground;
a multiplexer structured to select a voltage applied to the first drain pin in a first state, and to select a voltage applied to the second drain pin in a second state;
a pulse generator structured to generate a pulse signal based on an output voltage of the multiplexer;
a driving circuit structured to switch on and off the first synchronous rectification transistor according to the pulse signal in the first state, and to switch on and off the second synchronous rectification transistor according to the pulse signal in the second state; and
a phase controller structured to switch a state between the first state and the second state,
wherein, in the first state, the first threshold value and the second threshold value are generated with a source voltage of the first synchronous rectification transistor as a reference voltage,
and wherein, in the second state, the first threshold value and the second threshold value are generated with a source voltage of the second synchronous rectification transistor as a reference voltage.

26. The synchronous rectification controller according to claim 25, monolithically integrated on a single semiconductor substrate.

27. An insulated synchronous rectification DC/DC converter comprising the synchronous rectification controller according to claim 25.

28. The insulated synchronous rectification DC/DC converter according to claim 27, further comprising:
a transformer comprising a primary winding and a secondary winding;
a resonance capacitor coupled in series with the primary winding;
an inverter structured to apply an AC voltage to a series connection of the primary winding and the resonance capacitor;
a first synchronous rectification transistor and a second synchronous rectification transistor coupled to the secondary winding.

29. An electronic device comprising:
a load;
a diode rectifier circuit structured to full-wave rectify a commercial AC voltage;
a smoothing capacitor structured to smooth an output voltage of the diode rectifier circuit, so as to generate a DC input voltage; and
the DC/DC converter according to claim 27, structured to step down the DC input voltage, and to supply the DC input voltage thus stepped down to the load.

30. A power supply adapter comprising:
a diode rectifier circuit structured to full-wave rectify a commercial AC voltage;

a smoothing capacitor structured to smooth an output voltage of the diode rectifier circuit, so as to generate a DC input voltage; and the DC/DC converter according to claim 27, structured to step down the DC input voltage, and to supply the DC input voltage thus stepped down to a load.

* * * * *